Patented Sept. 22, 1936

2,054,814

UNITED STATES PATENT OFFICE 2,054,814

METHOD OF MAKING CHLORHYDRIN ESTERS

Charles G. Harford, Wollaston, Mass., assignor to Arthur D. Little, Incorporated, Cambridge, Mass., a corporation of Massachusetts No Drawing. Original application February 13, 1931, Serial No. 515,640. Divided and this application August 23, 1933, Serial No. 686,441

44 Claims. (Cl. 260—106)

This invention relates to a method of converting organic compounds typically containing an ethylene group such as the various unsaturated hydrocarbons, into chlorhydrin esters, and to the resulting products obtained.

Chlorhydrins have heretofore been made by the direct reaction of the corresponding olefin and hypochlorous acid. Hypochlorous acid, however, is an extremely unstable reagent and can be obtained and used only in dilute aqueous solutions. Even such dilute solutions decompose readily and therefore they must be used as rapidly as they are made. Accordingly, when hypochlorous acid is used undesirable side reactions are experienced and the reaction products obtained are generally dilute; and if a concentrated or pure compound is desired, the product must be concentrated.

Moreover, the decomposition products of hypochlorous acid,—principally hydrochloric acid, chlorine and oxygen,—tend to react (with olefins for example) to give undesirable by-products. These contaminate the desired product and are not easily removed therefrom.

A further difficulty encountered in the use of aqueous solutions of hypochlorous acid is their non-miscibility with olefins, or with hydrocarbons in general. As a result, irregular reaction and low proportionate yields of the desired reaction product are obtained, and a consequent waste or excessive consumption of reagent materials is unavoidably incurred.

It is, therefore, an object of this invention to provide a more convenient and more efficient method for the preparation of chlorhydrin esters. It is also an object to obtain such products in high proportionate yields and substantially free from other compounds. It is a further object to employ reagent materials which may be readily re-cycled for reuse in the process. Other objects will appear from the following description.

It is found, in accordance with the present invention, that organic compounds characterized by containing an ethylene group (—HC=CH—) such as the olefin hydrocarbons (which typically react with water, in the presence of a strong acid to form secondary alcohols) may be reacted upon directly with tertiary butyl hypochlorite in the presence of an organic acid to form the corresponding chlorhydrin ester. The reaction is characterized by liberation of the tertiary alcohol which may be converted to the hypochlorite for reuse. The chemical reactions involved may be represented by the following equation:

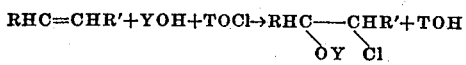

in which the symbols R and R' represent hydrogen or hydrocarbon radicals, which may be alike or unlike; Y represents an acyl radical; and T represents a tertiary alkyl radical.

By experiment it is found that ethylene, propylene, butylene, and amylenes, and also certain non-benzenoid, cyclic hydrocarbons such as the terpenes may be thus treated and that they react as indicated. It appears that the presence of an ethylene group (—HC=CH—) in the molecular structure is the criterion governing the applicability of a given compound or hydrocarbon in accordance with the invention. However, (without vitiating this rule) there may be certain inhibitions of the reactivity of the double bond in the manner indicated as is sometimes exemplified in the ethylene series of hydrocarbons as represented for example by failure to combine with bromine. This phenomenon of an occasional exception is generally attributable to stearic hindrance in the internal structure of the molecule, which is a condition well recognized in organic chemistry. Likewise, it is well known that, in the ethylene series, for example, the reactivity of the double bond decreases with increase in the number of carbon atoms in the molecule. Thus, the facility with which the reaction of the present invention may be effected progressively decreases with the higher members of the series, so that a point may be reached at which the industrial application of the process becomes impracticable. With cetene ($C_{16}H_{32}$) for example, the reaction does not appear to be applicable. In the preparation of ester compounds, however, as distinguished from chlorhydrin formation no such decrease in reactivity is observed.

In carrying out the process of this invention, the preferred reagent of the type TOCl is tertiary butyl hypochlorite having the structural formula:

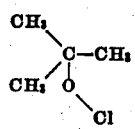

This reagent is conveniently prepared by the interaction of an inorganic hypochlorite, such as calicum hypochlorite, upon tertiary butyl alcohol. Tertiary butyl hypochlorite has desirable properties that commend it for the present use. In comparison with other organic hypochlorites it is quite stable. Furthermore it is an excellent solvent for hydrocarbons and organic acids, permitting through its use, for example, a reaction in one phase between an olefine, an organic acid and the hypochlorite. Owing probably to its comparative stability undesirable side reactions can be controlled. Yet another advantage of the particular hypochlorite is the ease and economy with which its decomposition product, tertiary butyl alcohol, can be separated from the chlorhydrin or chlorhydrin esters produced.

For example tertiary butyl hypochlorite (108.5 grams) is preferably mixed with butene-2 (56.1 grams) in substantially equimolecular proportions and the reaction mixture cooled, as before to prevent volatilization of the butene, or under sufficient pressure to effect the same result. The hypochlorite-butene mixture is then slowly added to acetic acid, with agitation and cooling of the reaction mixture, e. g., 1 mol. or 60 grams of acetic acid may be used. This acid may be of any strength between 80% and 100%. (The balance is water.) The mixture, which is originally two-phase, becomes single phase as the reaction is completed. The chlorhydrin ester produced (acetate of butyl chlorhydrin or chlorbutyl acetate) may be separated from the residual tertiary alcohol by distillation or by washing with water.

The recovery of the tertiary butyl alcohol and reconversion to the corresponding tertiary butyl hypochlorite may be carried out in accordance with any of the usual and well known procedures for effecting the reaction. For example, the alcohol may be mixed with milk of lime or a solution of caustic soda, cooled to about 10° C. and treated with chlorine to effect complete conversion. The tertiary butyl hypochlorite, being insoluble in water, is readily separated and washed free from reaction products. Under some circumstances it may be feasible to form the tertiary butyl hypochlorite in the presence of the organic compound containing the group —HC=CH—.

Alternatively, however, it may be feasible and advantageous to use the tertiary butyl alcohol directly in the formation of chlorhydrins or chlorhydrin esters, rather than using the tertiary butyl hypochlorite and then recovering the corresponding alcohol which is subsequently reconverted into the hypochlorite for reuse, as above described. This may be accomplished by treating the reaction mixture of the organic compound or hydrocarbon containing the —HC=CH— group and the tertiary butyl alcohol as an intermediary with chlorine and milk of lime.

It should be understood that the present disclosure is for the purpose of illustration only and that this invention includes all modifications and equivalents which fall within the scope of the appended claims.

This is a division of my application Serial No. 515,640, filed February 13, 1931.

I claim:

1. Method of making a chlorhydrin compound which comprises reacting a hydrocarbon compound containing the ethylene group —HC=CH— with a hypochlorite of a tertiary alcohol and with a compound of the formula YOH in which the symbol Y represents an acyl radical.

2. Method of making a chlorhydrin compound which comprises reacting a non-benzenoid hydrocarbon containing a double bond and having ten carbon atoms or less in the molecule with tertiary butyl hypochlorite and with a compound of the formula YOH in which the symbol Y represents an acyl radical.

3. Method of making a chlorhydrin compound which comprises reacting a hydrocarbon containing the ethylene group —HC=CH— with tertiary butyl hypochlorite and with a compound of the formula YOH in which the symbol Y represents an acyl radical.

4. Method of making a chlorhydrin compound which comprises reacting a hydrocarbon containing the ethylene group —HC=CH— and containing ten carbon atoms or less in the molecule, with tertiary butyl hypochlorite and with a compound of the formula YOH in which the symbol Y represents an acyl radical.

5. Method of making a chlorhydrin compound which comprises reacting a hydrocarbon containing the ethylene group —HC=CH— and containing eight carbon atoms or less in the molecule with tertiary butyl hypochlorite and with a compound of the formula YOH in which the symbol Y represents an acyl radical.

6. Method of making a chlorhydrin compound which comprises reacting a hydrocarbon containing the ethylene group —HC=CH— and containing six carbon atoms or less in the molecule, with tertiary butyl hypochlorite and with a compound of the formula YOH in which the symbol Y represents an acyl radical.

7. Method of making chlorhydrin compound which comprises reacting a hydrocarbon containing the group —HC=CH— and containing five carbon atoms or less in the molecule with tertiary butyl hypochlorite and with a compound of the formula YOH in which the symbol Y represents an acyl radical.

8. Method of making a chlorhydrin compound which comprises reacting a butylene containing the group —HC=CH— with tertiary butyl hypochlorite and with a compound of the formula YOH in which the symbol Y represents an acyl radical.

9. Method of making a chlorhydrin compound which comprises reacting propylene with tertiary butyl hypochlorite and with a compound of the formula YOH in which the symbol Y represents an acyl radical.

10. Method of making a chlorhydrin compound which comprises reacting ethylene with tertiary butyl hypochlorite and with a compound of the formula YOH in which the symbol Y represents an acyl radical.

11. Method of making a chlorhydrin compound which comprises reacting upon a solution of tertiary butyl hypochlorite and a hydrocarbon compound containing an ethylene group with a compound of the formula YOH in which the symbol Y represents an acyl radical.

12. Method of making a chlorhydrin compound which comprises reacting upon a solution of tertiary butyl hypochlorite and an unsaturated hydrocarbon of the non-benzenoid series containing a double bond with a compound of the formula YOH in which the symbol Y represents an acyl radical.

13. Method of making a chlorhydrin compound which comprises reacting upon a solution of tertiary butyl hypochlorite and a hydrocarbon of the ethylene series with a compound of the formula YOH in which the symbol Y represents an acyl radical.

14. Method of making a chlorhydrin compound which comprises reacting upon a solution of tertiary butyl hypochlorite and a hydrocarbon of the ethylene series containing ten carbon atoms or less in the molecule with a compound of the formula YOH in which the symbol Y represents an acyl radical.

15. Method of making a chlorhydrin compound which comprises reacting upon a solution of tertiary butyl hypochlorite and a hydrocarbon of the ethylene series containing eight carbon atoms or less in the molecule with a compound of the formula YOH in which the symbol Y represents an acyl radical.

16. Method of making a chlorhydrin compound which comprises reacting upon a solution of tertiary butyl hypochlorite and a hydrocarbon of the ethylene series containing six carbon atoms or less in the molecule with a compound of the formula YOH in which the symbol Y represents an acyl radical.

17. Method of making a chlorhydrin compound which comprises reacting upon a solution of tertiary butyl hypochlorite and a hydrocarbon containing the group —HC=CH— and containing five carbons or less with a compound of the formula YOH in which the symbol Y represents an acyl radical.

18. Method of making a chlorhydrin compound which comprises reacting upon a solution of tertiary butyl hypochlorite and a butylene containing the group —HC=CH— with a compound of the formula YOH in which the symbol Y represents an acyl radical.

19. Method of making a chlorhydrin compound which comprises reacting upon a solution of tertiary butyl hypochlorite and propylene with a compound of the formula YOH in which the symbol Y represents an acyl radical.

20. Method of making a chlorhydrin compound which comprises reacting upon a solution of tertiary butyl hypochlorite and ethylene with a compound of the formula YOH in which the symbol Y represents an acyl radical.

21. Method of making a chlorhydrin ester which comprises reacting a hydrocarbon compound containing the ethylene group

—HC=CH— with a hypochlorite of a tertiary alcohol and with acetic acid.

22. Method of making a chlorhydrin ester which comprises reacting a non-benzenoid hydrocarbon containing the ethylene group

—HC=CH— with tertiary butyl hypochlorite and with acetic acid.

23. Method of making a chlorhydrin ester which comprises reacting butene—2 containing the ethylene group —HC=CH— with tertiary butyl hypochlorite and with acetic acid.

24. Method of making a chlorhydrin compound which comprises reacting hydrocarbon compound containing the ethylene group

—HC=CH— with a compound of the formula YOH in which the symbol Y represents an acyl radical, and a reagent containing the radical —OCl through the intermediary action of tertiary butyl alcohol with said —OCl radical.

25. Method of making a chlorhydrin compound which comprises reacting a non-benzenoid hydrocarbon containing the ethylene group

—HC=CH— with a compound of the formula YOH in which the symbol Y represents an acyl radical, and a reagent containing the radical —OCl through the intermediary action of tertiary butyl alcohol with said —OCl radical.

26. Method of making chlorhydrin esters which comprises reacting a non-benzenoid hydrocarbon containing a double bond with a hypochlorite of a tertiary alcohol and a compound of the formula YOH in which the symbol Y represents an acyl radical.

27. Method of making chlorhydrin esters which comprises reacting a non-benzenoid hydrocarbon containing a double bond with tertiary butyl hypochlorite and a compound of the formula YOH in which the symbol Y represents an acyl radical.

28. Method of making chlorhydrin esters which comprises reacting a non-benzenoid hydrocarbon containing a double bond with a hypochlorite of a tertiary alcohol and an organic acid.

29. Method of making chlorhydrin esters which comprises reacting a non-benzenoid hydrocarbon containing a double bond with tertiary butyl hypochlorite and an organic acid.

30. Method of making chlorhydrin esters which comprises reacting a non-benzenoid hydrocarbon containing a double bond with a hypochlorite of a tertiary alcohol and an aliphatic acid.

31. Method of making chlorhydrin esters which comprises reacting a non-benzenoid hydrocarbon containing a double bond with tertiary butyl hypochlorite and an aliphatic acid.

32. Method of making chlorhydrin esters which comprises reacting an olefin with a hypochlorite of a tertiary alcohol and an organic acid.

33. Method of making chlorhydrin esters which comprises reacting an olefin with tertiary butyl hypochlorite and an organic acid.

34. Method of making chlorhydrin esters which comprises reacting an olefin with a hypochlorite of a tertiary alcohol and an aliphatic acid.

35. Method of making chlorhydrin esters which comprises reacting an olefin with tertiary butyl hypochlorite and an aliphatic acid.

36. Method of making chlorhydrin esters which comprises reacting a hydrocarbon containing a straight chain double bond with a compound of the formula YOH in which the symbol Y represents an acyl radical with the reaction taking place at the double bond, and a reagent containing the radical —OCl through the intermediary action of a tertiary alcohol.

37. Method of making chlorhydrin esters which comprises reacting a non-benzenoid hydrocarbon containing a double bond with a compound of the formula YOH in which the symbol Y represents an acyl radical, and a reagent containing the radical —OCl through the intermediary action of a tertiary alcohol.

38. Method of making chlorhydrin esters which comprises reacting an olefin hydrocarbon with a compound of the formula YOH in which the symbol Y represents an acyl radical, and a reagent containing the radical —OCl through the intermediary action of a tertiary alcohol.

39. Method of making chlorhydrin esters which comprises reacting an olefin hydrocarbon with a hypochlorite of a tertiary alcohol and with a compound of the formula YOH in which Y represents an acyl radical.

40. Method of making chlorhydrin esters which comprises reacting upon a solution of an olefin hydrocarbon and a hypochlorite of a tertiary alcohol with a compound of the formula YOH in which Y represents an acyl radical.

41. Method of making chlorhydrin ester which comprises reacting an olefin with tertiary butyl hypochlorite and acetic acid.

42. Method of making chlorhydrin ester which comprises reacting a butylene with tertiary butyl hypochlorite and acetic acid.

43. Method of making chlorhydrin ester which comprises reacting propylene with tertiary butyl hypochlorite and acetic acid.

44. Method of making chlorhydrin ester which comprises reacting ethylene with tertiary butyl hypochlorite and acetic acid.

CHARLES G. HARFORD.